(12) United States Patent
Ura et al.

(10) Patent No.: US 6,202,452 B1
(45) Date of Patent: Mar. 20, 2001

(54) WASHING MACHINE (75) Inventors: Toshihiko Ura, Osaka; Kenichi Akasaka, Hyogo; Kenji Koshiga; Norimasa Kondo, both of Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/295,351

(22) Filed: Apr. 21, 1999

(30) Foreign Application Priority Data

May 28, 1998 (JP) .................................................. 10-147131

(51) Int. Cl.[7] .................................................. D06F 37/40
(52) U.S. Cl. .................................................. 68/23.7
(58) Field of Search ...................... 68/23.6, 23.7

(56) References Cited

U.S. PATENT DOCUMENTS

| 2,485,621 | * | 10/1949 | McNairy | 68/23.7 X |
| 2,485,622 | * | 10/1949 | Bariffi | 68/23.7 X |
| 4,232,536 | * | 11/1980 | Koseki et al. | 68/23.7 X |
| 4,969,341 | | 11/1990 | Burk et al. | |
| 5,778,703 | * | 7/1998 | Imai et al. | 68/23.7 X |

FOREIGN PATENT DOCUMENTS

| 4-256796 | 9/1992 | (JP) . |
| 9-122385 | 5/1997 | (JP) . |

* cited by examiner

Primary Examiner—Phililp R. Coe
(74) Attorney, Agent, or Firm—Wenderoth, Lind, & Ponack, L.L.P.

(57) ABSTRACT

A motor drives, via a hollow dryer shaft, a basket doubling as a washing basket and a spin-dryer basket. The motor rotating speed is reduced by a speed reduction mechanism, thereby driving an agitator disposed in the basket via a washing shaft that is axially aligned with the dryer shaft. A clutch switches transmission of the motor driving force either to the dryer shaft or to the washing shaft. The speed reduction mechanism and the motor are axially aligned with one another. The clutch is placed within a motor bracket, and is controlled by a clutch driver that is inserted into the bracket through a hole provided on the motor bracket. These arrangements restrain unbalance of a water tub during a dehydrating step, as well as prevent water or fingers of users from entering the motor.

22 Claims, 8 Drawing Sheets

WASHING MACHINE

FIELD OF THE INVENTION

The present invention relates to a construction of a washing machine that cleanses, rinses and dehydrates clothes.

BACKGROUND OF THE INVENTION

A structure of a conventional washing machine is described with reference to FIG. 11 and FIG. 12.

Figure 11:
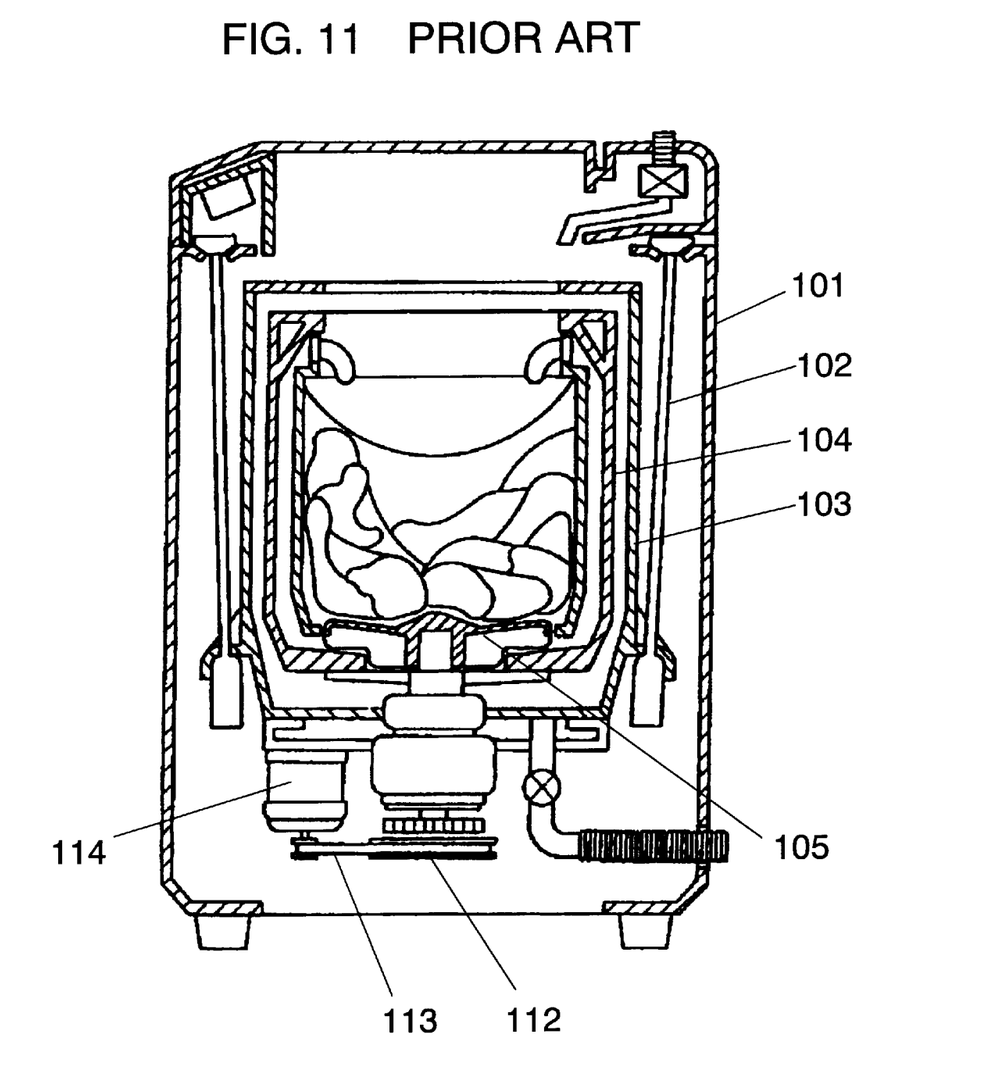
FIG. 11 is a cross sectional view of a conventional washing machine.
Figure 12:
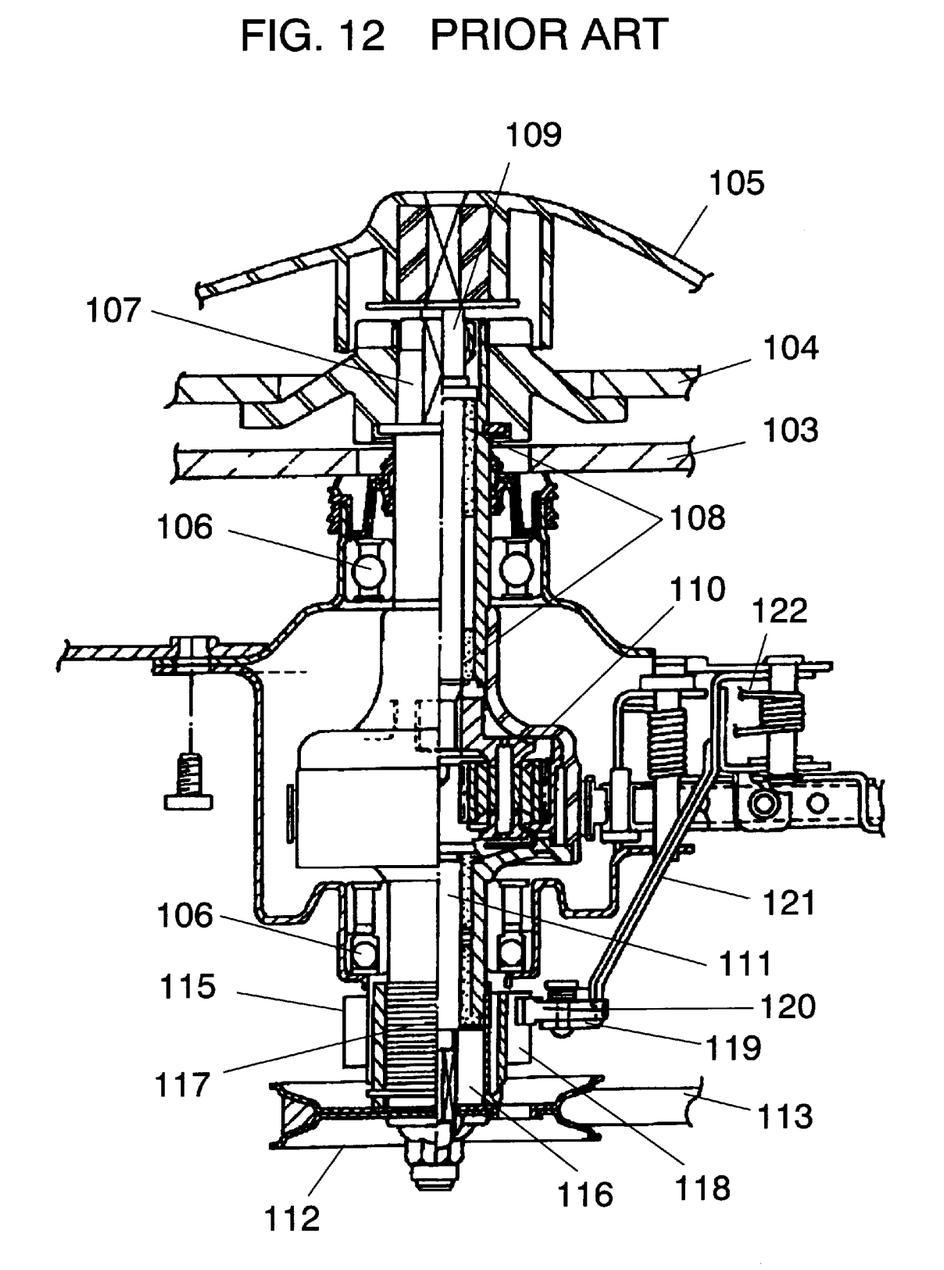
FIG. 12 is a cross sectional view of an essential part of the conventional washing machine.

FIG. 11 is a cross sectional view of the conventional washing machine, and FIG. 12 is a cross sectional view of an essential part of the same machine.

In FIG. 11, a body 101 of a washing machine has a water tub 103 supported by suspension 102. In water tub 103, a cleansing basket 104 doubling as a spin dryer (hereinafter referred to as basket 104) is installed rotatably. Basket 104 has a top opening, through which articles to be cleansed are loaded. On a bottom section of basket 104, an agitator 105 (pulsator) is equipped rotatably. Basket 104 has numerous small holes in a sidewall thereof.

In FIG. 12, basket 104 is fixed to a dryer shaft 107 journaled by a bearing 106 disposed at a lower part of water tub 103. Agitator 105 is fixed at a first end of a washing shaft 109 journaled by a bearing 108 within the dryer shaft 107. A second end of washing shaft 109 is coupled to a first end of an input shaft 111 of a speed reduction mechanism 110. Pulley 112 is mounted to a second end of input shaft 111 of the speed reduction mechanism 110.

The second end of input shaft 111 shows a circle in its cross sectional view, and is sided by shaving to form a quadrilateral so that a mounting hole of pulley 112 can mate with the shaved second end, and pulley 112 is fixed to shaft 111. Pulley 112 is coupled to a motor 114 shown in FIG. 11 via a belt 113. Motor 114 drives shaft 111 via pulley 112. Shaft 111 has a clutch 115 for switching the transmission of the driving force of motor 114 either to washing shaft 109 or to dryer shaft 107.

Clutch 115 comprises the following elements:
(a) a clutch boss 116 having a hole mating with the shaved second end of shaft 111;
(b) a clutch spring 117; and
(c) a sleeve 118 for transmitting the force of a clutch driver 119 for driving the clutch. A first end of spring 117 winds around clutch boss 116 and a second thereof winds around dryer shaft 107.

Clutch driver 119 comprises the following elements:
(a) a clutch claw 120;
(b) a clutch lever 121;
(c) a clutch switcher (not shown) including, e.g. a geared motor for rotating clutch lever 121; and
(d) a clutch lever spring 122.

An operation of the conventional washing machine constructed above is hereinafter described.

First, laundry is loaded into basket 104, then a given quantity of water is supplied from a water tap (not shown). When the given quantity of water is filled into basket 104, washing is initiated. At this moment, spring 122 urges clutch claw 120 of clutch driver 119 to be engaged with sleeve 118, and loosens spring 117. This produces slipping between spring 117 and clutch boss 116.

The rotating force of motor 114 not only drives pulley 112 via belt 113, but also drives shaft 111 of the speed reduction mechanism. Shaft 111 then drives washing shaft 109 via speed reduction mechanism 110, and further drives agitator 105 fixed to washing shaft 109. Motor 114 is switched in its driving direction at given time intervals, which also switches the rotating direction of agitator 105. The laundry thus starts being cleansed.

Then, the water is discharged from basket 104 when the cleansing step is finished, and then spin-drying is begun. At this moment, a clutch switcher rotates clutch lever 121, whereby claw 120 is removed from sleeve 118, and spring 117 winds around boss 116.

Under this condition, the driving force of motor 114 travels to pulley 112 via belt 113 and drives shaft 111. The motor further drives dryer shaft 107 via clutch boss 116 and spring 117. Basket 104 fixed to dryer shaft 107 is then spun, which dehydrates the laundry. The water is discharged through the numerous small holes punched in the sidewall of the basket 104.

As such, clutch 115 controls the driving of agitator 105 or basket 104 so that the respective steps of cleansing, rinsing and dehydrating can be performed.

In this conventional construction, however, motor 114 is coupled to the driving mechanism via belt 113, which requires a lot of components and increases cost. Further, motor 114 is eccentric relative to the rotational axis of basket 104, and the rotating force of the motor 114 is transferred via belt 113 to the basket 104, whereby it is difficult to balance water tub 103.

SUMMARY OF THE INVENTION

The present invention addresses the problems discussed above and aims to provide a washing machine comprising the following elements:
(a) a dryer shaft for spinning the basket doubling as a washing basket and a spin-drying basket;
(b) a washing shaft for spinning an agitator disposed in the basket, and disposed on the same axial line of the dryer shaft;
(c) a motor for driving the dryer shaft and the washing shaft;
(d) a speed reduction mechanism for reducing a driving speed of the motor, and then rotating the washing shaft;
(e) a clutch for switching the transmission of the motor driving force either to the dryer shaft or to the washing shaft.

The speed reduction mechanism is axially aligned with the motor, and the clutch is disposed within a motor bracket, which motor bracket is one of elements of the motor. A clutch driver for driving the clutch is driven from outside the motor bracket.

The above construction of the washing machine of the present invention requires fewer components and restrains unbalance of the water tub during the dehydration step. Further, if the water in water tub somehow overflows from the tub, the water is prevented from entering the motor. If a user mistakenly places his/her hand near the clutch, the fingers are prevented from entering the motor. The safety of the washing machine is thus improved.

DETAILED DESCRIPTION OF THE EXEMPLARY EMBODIMENTS

Exemplary embodiments of the present invention are described hereinafter with reference to the accompanied drawings.

(Exemplary Embodiment 1)

Figure 1:
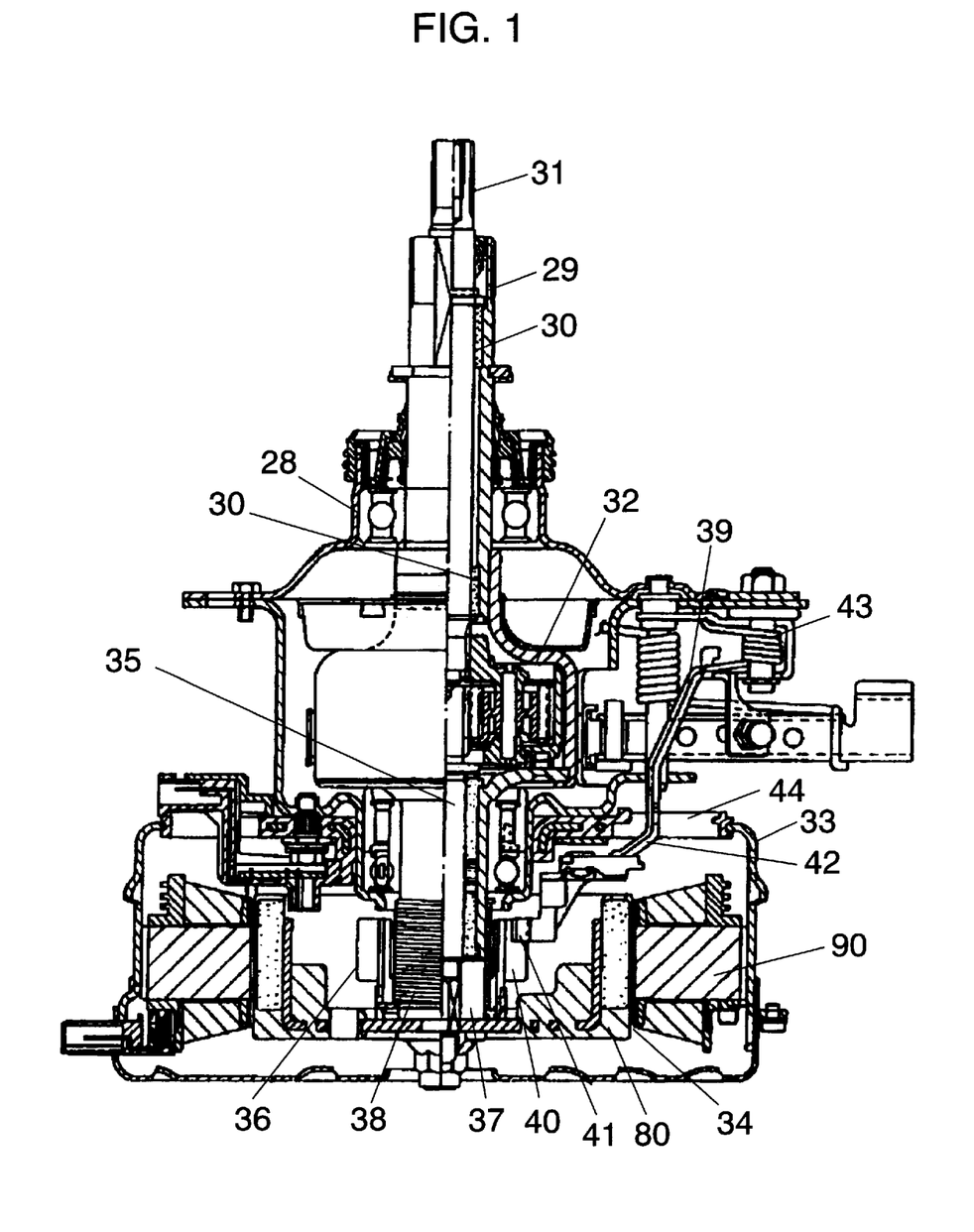
FIG. 1 is a cross sectional view of an essential part of a washing machine in accordance with a first exemplary embodiment of the present invention.
Figure 2:
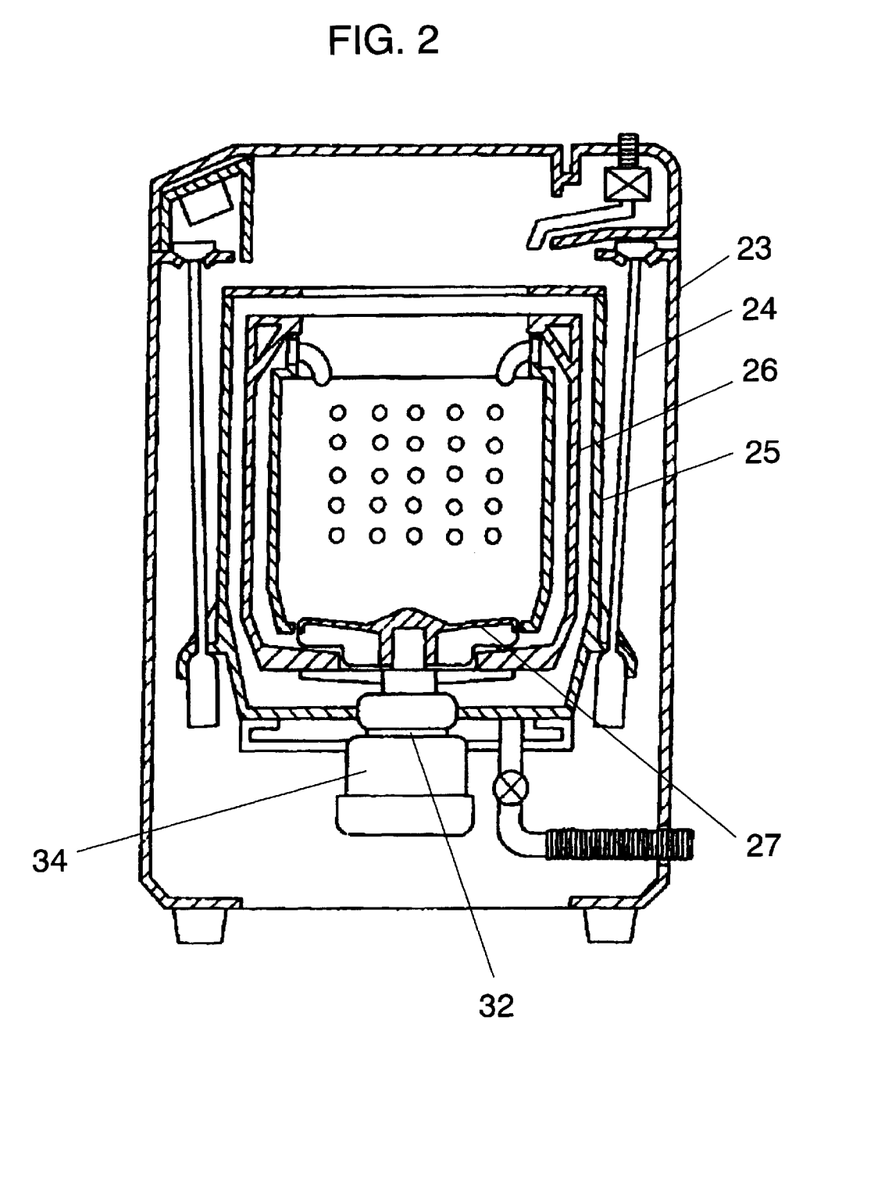
FIG. 2 is a cross sectional view of the washing machine of FIG. 1.

FIG. 1 is a cross sectional view of an essential part of a washing machine in accordance with the first exemplary embodiment of the present invention, and FIG. 2 is a cross sectional view of the same washing machine.

In FIG. 2, a body 23 of the washing machine includes therein a water tub 25 supported by a suspension 24 to prevent vibration during a dehydrating step. In tub 25, a basket 26 doubling as a washing basket and a spin-drying basket is rotatably disposed. On the inner bottom of basket 26, an agitator 27 for agitating laundry is disposed rotatably.

Basket 26 is fixed to an upper end of dryer shaft 29 journaled by a bearing 28 disposed at a bottom section of water tub 25, as shown in FIG. 1. In dryer shaft 29, a washing shaft 31 is journaled by a bearing 30 disposed also in dryer shaft 29. Washing shaft 31 is co-axial with dryer shaft 29. Agitator 27 is mounted to an upper end of washing shaft 31.

A lower end of washing shaft 31 is coupled to an output side of a speed reduction mechanism 32, and an input shaft 35 of the speed reduction mechanism is disposed at the input side thereof.

A motor bracket 33 is shaped as a cup, and has its opening facing downwardly. Speed reduction mechanism 32 is mounted to an upper section of motor bracket 33. A stator 90 that provides a rotor 80 with rotational magnetic field is press-fitted into an inner wall of bracket 33. A motor 34 comprises stator 90 and rotor 80 facing each other with an annular space therebetween. Input shaft 35 of the speed reduction mechanism is mounted to rotor 80, and speed reduction mechanism 32 is axially aligned with motor 34. This relative location of speed reduction mechanism 32 and motor 34 is one of the advantages of the present invention.

A clutch 36 transmits the motor rotation to either dryer shaft 29 or washing shaft 31. Clutch 36 comprises the following elements:

(a) a clutch boss 37;

(b) a clutch spring 38; and (c) a sleeve 40 for transmitting the force of a clutch driver 39 to clutch spring 38 for driving the clutch 36. A tip section of input shaft 35 shows a circle in its cross sectional view, and is sided by shaving to form a quadrilateral so that clutch boss 37, having a hole mating with the shaved section, is fixed to shaft 35. A first end of clutch spring 38 winds around clutch boss 37, and a second end thereof winds around dryer shaft 29. Clutch 36 is disposed within motor bracket 33.

Clutch driver 39 comprises the following elements:

(a) a clutch claw 41;

(b) a clutch lever 42;

(c) a clutch switcher (not shown) including, e.g. a geared motor for rotating clutch lever 42; and (d) a clutch lever spring 43.

Clutch driver 39 operates as follows. Motor bracket 33 is provided with a hole 44, and clutch lever 42 is inserted into hole 44. Clutch driver 39 is driven by the clutch switcher from outside so that clutch lever 42 can rotate.

The washing machine including the construction discussed above in accordance with the first exemplary embodiment operates as follows.

During the cleansing and rinsing steps, clutch driver 39 releases spring 38 so that a rotational force does not travel to dryer shaft 29. In other words, clutch lever spring 43 urges claw 41 into engagement with sleeve 40 and loosens clutch spring 38. As a result, slipping occurs between spring 38 and boss 37. The rotating force of motor 34 thus travels only to agitator 27 via washing shaft 31, which applies a mechanical force to the laundry. The laundry in basket 26 thus undergoes the cleansing and rinsing steps.

After the cleansing and rinsing steps, spin-drying takes place. During the spin-drying step, the clutch switcher rotates clutch lever 42 so that claw 41 is removed from sleeve 40, and spring 38 winds around boss 37. Then, shaft 35 is coupled with dryer shaft 29 so that the rotating force of motor 34 is transmitted to dryer shaft 29. Basket 26 mounted to dryer shaft 29 is then rotated.

Water removed from the laundry is discharged through numerous small holes punched in a side-wall of basket 26 and into water tub 25 due to centrifugal force generated by spinning of basket 26. The laundry is thus automatically dehydrated. As such, the laundry loaded into basket 26 automatically undergoes respective steps of cleansing, rinsing and dehydrating.

The specific structures utilized in this embodiment produce the following advantages. Washing shaft 31 and dryer shaft 29 are co-axially arranged because of the hollow structure of dryer shaft 29. Speed reduction mechanism 32 and motor 34 extend in this order from agitator 27. Speed reduction mechanism 32 and motor 34 are co-axial with one another, so that motor 34 and speed reduction mechanism 32 are integrated and the center of gravity of these two elements is located on the axis of water tub 25. Therefore, where the conventional structure suffered unbalance of the water tub because the motor was not axially aligned with the water tub, water tub 25 does not suffer any unbalance, and vibration during the dehydrating step can be restrained.

This structure also eliminates the need for a belt, and the rotating force of motor 34 is directly transmitted to washing shaft 31 and dryer shaft 29, and therefore, the number of required components can be reduced.

Since motor 34 is disposed within motor bracket 33, if the water somehow overflows the tub 25, the water is prevented from entering the motor 34. Further, if users mistakenly touch around clutch lever 42, the fingers of the users are prevented from entering motor 34. The safety of the washing machine is thus improved.

Clutch driver 39 is inserted through hole 44 punched in motor bracket 33, so that only clutch lever 42 extends through hole 44 after the insertion, which increases the reliability of clutch 36, and forms a compact driving mechanism assembled in the axial direction.

(Exemplary Embodiment 2)

Figure 3:
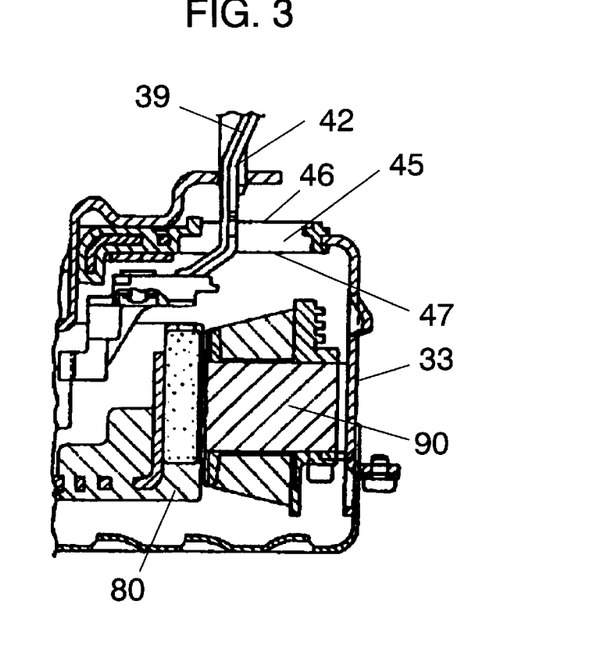
FIG. 3 is a cross sectional view of an essential part of a washing machine in accordance with a second exemplary embodiment of the present invention.

FIG. 3 is a cross sectional view of an essential part of a washing machine in accordance with the second exemplary embodiment of the present invention.

As shown in FIG. 3, a hole 45 is punched in motor bracket 33 to receive clutch driver 39 therein. Hole 45 has different opening areas at an inlet end 46 and an outlet end 47. Other structures are the same as in the first exemplary embodiment. This allows hole 45 to minimize its opening area, which strengthens motor bracket 33 as well as shortens the driving mechanism in the axial direction.

(Exemplary Embodiment 3)

Figure 4:
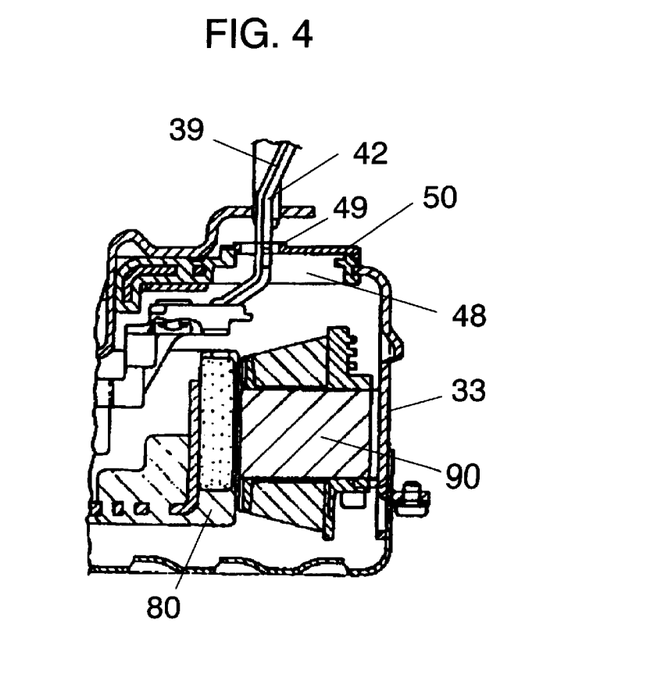
FIG. 4 is a cross sectional view of an essential part of a washing machine in accordance with a third exemplary embodiment of the present invention.

FIG. 4 is a cross sectional view of an essential part of a washing machine in accordance with the third exemplary embodiment of the present invention.

As shown in FIG. 4, motor bracket 33 is provided with a hole 48 through which clutch driver 39 can be inserted. Hole 48 has a necessary shape and size for receiving clutch driver 39. After clutch driver 39 extends through hole 48, a cover 50 is disposed over hole 48. Cover 50 has a hole 49 of a shape and a size necessary for allowing clutch lever 42 to rotate. Other structures are the same as in the previous exemplary embodiments. If the water somehow overflows tub 25, this cover 50 prevents the water dropped on the floor from splashing into motor bracket 33. Also, if users mistakenly touch around clutch lever 42, this cover 50 can prevent the fingers from entering into motor bracket 33. The safety of the washing machine is thus improved.

(Exemplary Embodiment 4)

Figure 5:
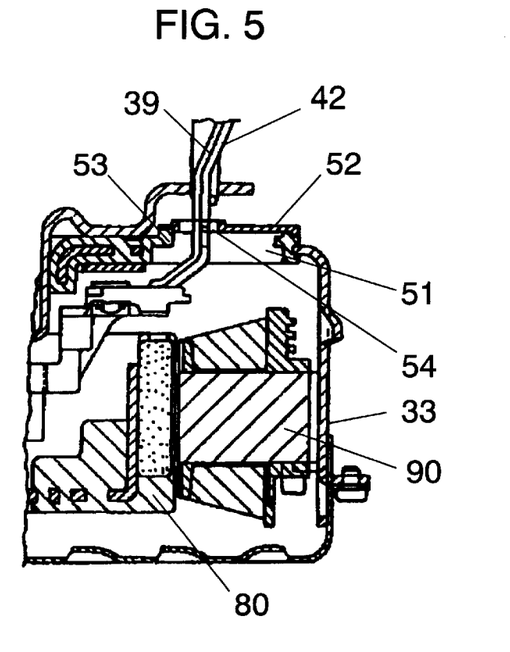
FIG. 5 is a cross sectional view of an essential part of a washing machine in accordance with a fourth exemplary embodiment of the present invention.

FIG. 5 is a cross sectional view of an essential part of a washing machine in accordance with the fourth exemplary embodiment of the present invention.

As shown in FIG. 5, motor bracket 33 is provided with hole 51 through which clutch driver 39 can be inserted. Rib 53 is provided at part of a surrounding area of hole 51 so that rib 53 is engaged with a notch of a cover 52. Cover 52 has a hole 54 of a shape and a size necessary for allowing clutch lever 42 to rotate. The notch is provided around the hole 54 so that cover 52 is easily mounted to motor bracket 33. Other structures are the same as in the third exemplary embodiment.

Since rib 53 engaging with the notch of cover 52 is provided on part of the surrounding area of hole 51, if the water somehow overflows tub 25, the water dropped on the floor is prevented from splashing through hole 54 into motor bracket 33. If users mistakenly touch around clutch lever 42, the fingers of the users are prevented from entering motor bracket 33. The safety of the washing machine is thus improved.

(Exemplary Embodiment 5)

Figure 6:
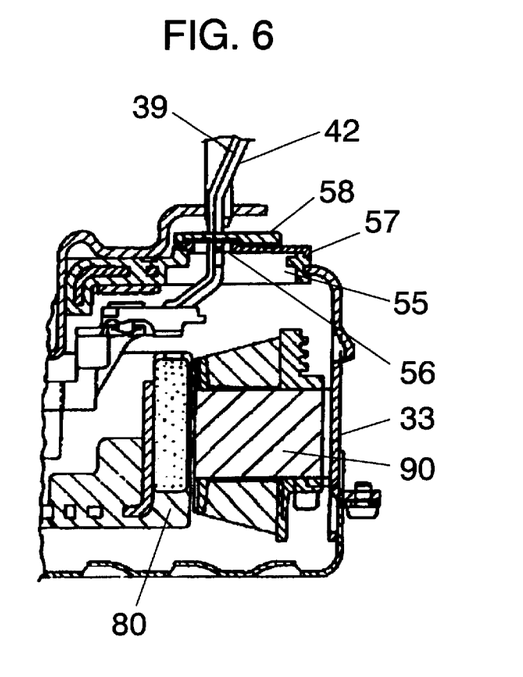
FIG. 6 is a cross sectional view of an essential part of a washing machine in accordance with a fifth exemplary embodiment of the present invention.

FIG. 6 is a cross sectional view of an essential part of a washing machine in accordance with the fifth exemplary embodiment of the present invention.

As shown in FIG. 6, motor bracket 33 is provided with a hole 55 through which clutch driver 39 can be inserted. A cover 57 is provided to cover hole 55, and this cover 57 has a hole 56 of a shape and a size necessary for allowing clutch lever 42 to rotate. A cover 58 linked to clutch lever 42 always covers hole 56 in cover 57. Other structures are the same as the embodiments previously discussed.

Since cover 58 linked to lever 42 always covers hole 56 in cover 57, if the water somehow overflows tub 25, this cover 58 strictly prevents the water dropped on the floor from splashing through hole 56 into motor bracket 33. If users mistakenly touch around clutch lever 42, this cover 58 can prevent the fingers of the users from entering motor bracket 33. The safety of the washing machine is thus improved.

(Exemplary Embodiment 6)

Figure 7:
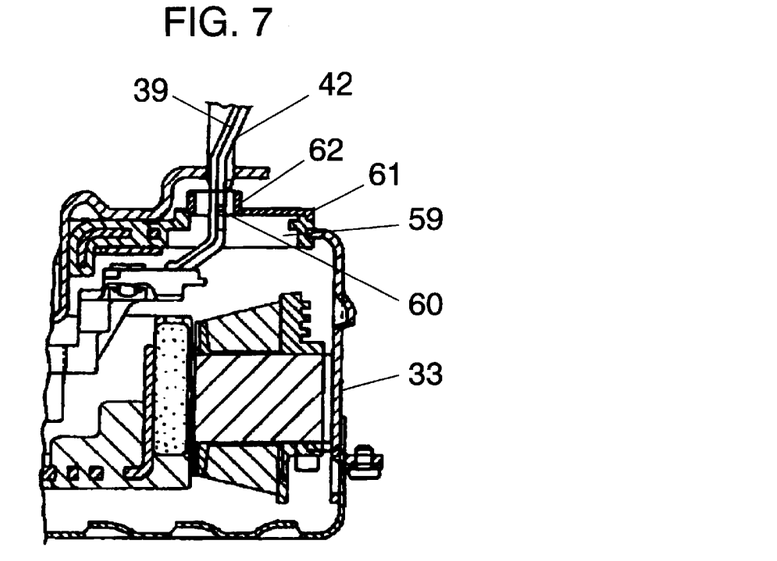
FIG. 7 is a cross sectional view of an essential part of a washing machine in accordance with a sixth exemplary embodiment of the present invention.

FIG. 7 is a cross sectional view of an essential part of a washing machine in accordance with the sixth exemplary embodiment of the present invention.

As FIG. 7 illustrates, motor bracket 33 is provided with a hole 59 through which clutch driver 39 is inserted. Hole 59 is provided with a cover 61 having a hole 60 of a shape and a size necessary for allowing clutch lever 42 to rotate. A tubular rib 62 is provided around hole 60 in order to form a wall so that hole 60 becomes longer. Other structures are the same as in the embodiments 1 through 4.

If the water somehow overflows tub 25, this tubular rib or wall 62 strictly prevents the water dropped on the floor from splashing through hole 60 into motor bracket 33. If users mistakenly touch around clutch lever 42, this tubular wall 62 can prevent the fingers of the users from entering motor bracket 33. The safety of the washing machine is thus improved.

(Exemplary Embodiment 7)

Figure 8:
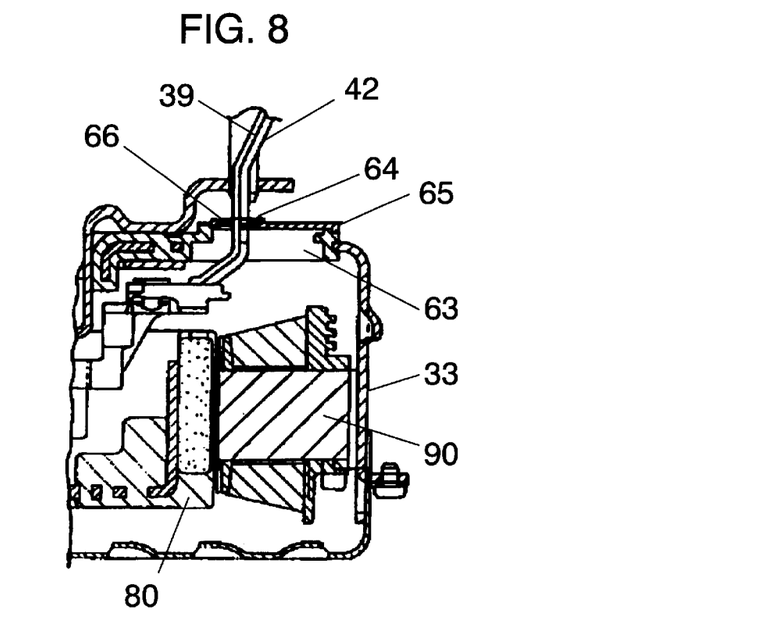
FIG. 8 is a cross sectional view of an essential part of a washing machine in accordance with a seventh exemplary embodiment of the present invention.

FIG. 8 is a cross sectional view of an essential part of a washing machine in accordance with the seventh exemplary embodiment of the present invention. As FIG. 8 illustrates, motor bracket 33 is provided with a hole 63 through which clutch driver 39 is inserted. Hole 63 is provided with a cover 65 having a hole 64 of a shape and a size necessary for allowing clutch lever 42 to rotate. A rubber-like elastic body 66 seals hole 64. Other structures are the same as in the embodiments 1 through 4.

If the water somehow overflows tub 25, this rubber-like elastic body 66 strictly prevents the water dropped on the floor from splashing through hole 64 into motor bracket 33. If users mistakenly touch around clutch lever 42, this rubber-like elastic body 66 can prevent the fingers of the users from entering motor bracket 33. The safety of the washing machine is thus improved.

(Exemplary Embodiment 8)

Figure 9:
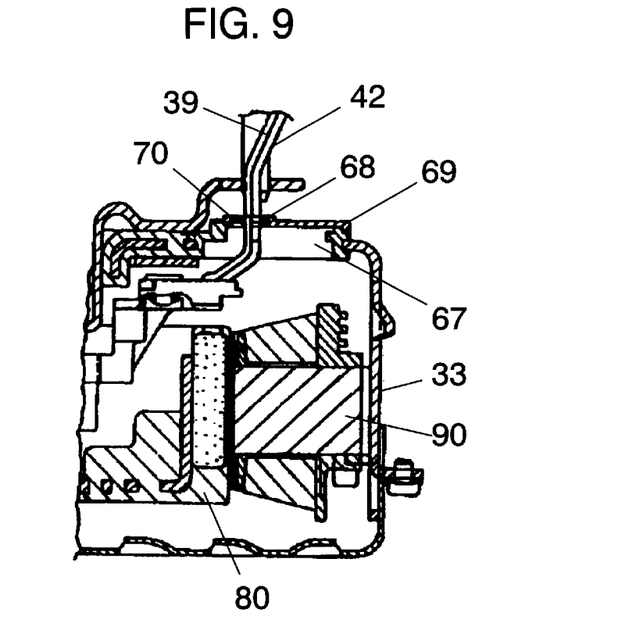
FIG. 9 is a cross sectional view of an essential part of a washing machine in accordance with an eighth exemplary embodiment of the present invention.

FIG. 9 is a cross sectional view of an essential part of a washing machine in accordance with the eighth exemplary embodiment of the present invention. As FIG. 9 illustrates, motor bracket 33 is provided with a hole 67 through which clutch driver 39 is inserted. Hole 67 is provided with a cover 69 having a hole 68 of a shape and a size necessary for allowing clutch lever 42 to rotate. Hole 68 is sealed by a brush-like seal 70 fixed at a surrounding section of hole 68. Other structures are the same as in the embodiments 1 through 4.

If the water somehow overflows tub 25, this brush-like seal 70 strictly prevents the water dropped on the floor from splashing through hole 68 into motor bracket 33. If users mistakenly touch around clutch lever 42, this brush-like seal 70 can prevent the fingers of the users from entering motor bracket 33. The safety of the washing machine is thus improved.

(Exemplary embodiment 9)

Figure 10:
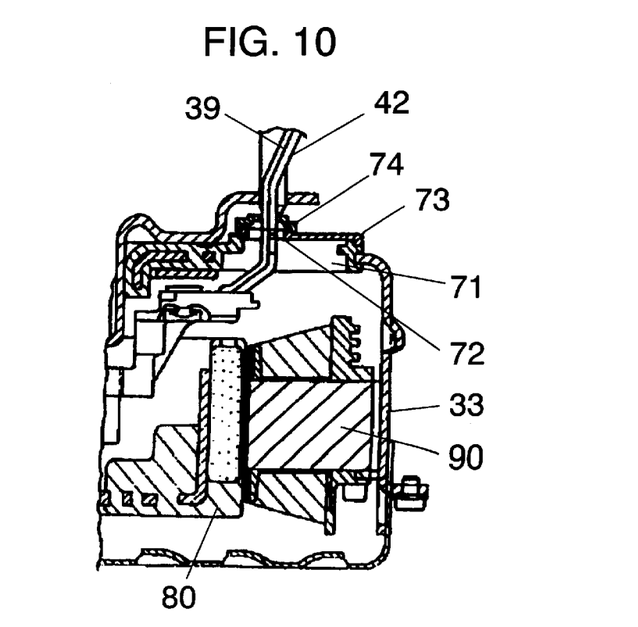
FIG. 10 is a cross sectional view of an essential part of a washing machine in accordance with a ninth exemplary embodiment of the present invention.

FIG. 10 is a cross sectional view of an essential part of a washing machine in accordance with the ninth exemplary embodiment of the present invention.

As FIG. 10 illustrates, motor bracket 33 is provided with a hole 71 through which clutch driver 39 is inserted. Hole 71 is provided with a cover 73 having a hole 72 of a shape and a size necessary for allowing clutch lever 42 to rotate. Hole 72 is covered by a bellows-like elastic body 74 having a first end fixed to cover 73, and a second end linked to clutch lever 42. Bellows-like elastic body 74 is preferably a flexible tube. Other structures are the same as in the embodiments 1 through 4.

If the water somehow overflows tub 25, this bellows-like elastic body 74 strictly prevents the water dropped on the floor from splashing through hole 72 into motor bracket 33. If users mistakenly touch around clutch lever 42, this bellows-like elastic body 74 can prevent the fingers of the users from entering into motor bracket 33. The safety of the washing machine is thus improved.

As discussed above, the present invention can provide the following advantages: (a) Unbalance of the water tub during the dehydrating step can be restrained with fewer components. (b) Since the motor bracket is provided with a hole through which the clutch driver is inserted, the reliability of the clutch can be improved, and a compact driving mechanism assembled in the axial direction is formed. (c) The hole provided through the motor bracket allows its opening area to be minimized, and therefore, if the water somehow overflows the water tub, the water dropped on the floor is prevented from splashing through the hole where the clutch lever rotates, and into the motor bracket. (d) If users mistakenly touch around the clutch lever of the clutch driver, the fingers of the users can be prevented from entering the motor bracket.

What is claimed is:

1. A washing machine comprising:
   a dryer shaft to rotate a basket;
   a washing shaft to rotate an agitator to be disposed within the basket, with said dryer shaft and said washing shaft being axially aligned with each other;
   a motor to drive said dryer shaft and said washing shaft;
   a speed reduction mechanism to reduce a driving speed of said motor that is to be transmitted to said washing shaft;
   a clutch, disposed within a motor bracket, to allow transmission of a motor driving force to either said dryer shaft or said washing shaft; and
   a clutch driver to drive said clutch, wherein said clutch driver extends from a location that is exterior said motor bracket to a position that is interior said motor bracket.

2. The washing machine according to claim 1, wherein said motor bracket includes an opening through which said clutch driver extends.

3. The washing machine according to claim 2, and further comprising a first cover to be positioned across said opening, wherein said first cover includes an aperture through which said clutch driver extends when said first cover is positioned across said opening.

4. The washing machine according to claim 3, and further comprising a rib located at said opening, wherein said cover is engaged with said rib when said cover is positioned across said opening.

5. The washing machine according to claim 3, and further comprising a second cover to be positioned across said aperture, wherein said second cover is linked to said clutch driver.

6. The washing machine according to claim 3, and further comprising a rib surrounding said aperture.

7. The washing machine according to claim 3, and further comprising an elastic body to seal said aperture, wherein said elastic body is linked to said clutch driver.

8. The washing machine according to claim 3, and further comprising a rubber-like elastic body to seal said aperture, wherein said rubber-like elastic body is linked to said clutch driver.

9. The washing machine according to claim 3, and further comprising a brush-like body to seal said aperture, wherein said brush-like body is linked to said clutch driver.

10. The washing machine according to claim 3, and further comprising a bellows-like body to seal said aperture, wherein said bellows-like body is linked to said clutch driver.

11. The washing machine according to claim 2, wherein said opening includes a cross-sectional area at one end thereof that is different than a cross-sectional area at a second end thereof.

12. The washing machine according to claim 11, and further comprising a first cover to be positioned across said opening, wherein said first cover includes an aperture through which said clutch driver extends when said first cover is positioned across said opening.

13. The washing machine according to claim 12, and further comprising a rib located at said opening, wherein said cover is engaged with said rib when said cover is positioned across said opening.

14. The washing machine according to claim 12, and further comprising a second cover to be positioned across said aperture, wherein said second cover is linked to said clutch driver.

15. The washing machine according to claim 12, and further comprising a rib surrounding said aperture.

16. The washing machine according to claim 12, and further comprising an elastic body to seal said aperture, wherein said elastic body is linked to said clutch driver.

17. The washing machine according to claim 12, and further comprising a rubber-like elastic body to seal said aperture, wherein said rubber-like elastic body is linked to said clutch driver.

18. The washing machine according to claim 12, and further comprising and further comprising a brush-like body to seal said aperture, wherein said brush-like body is linked to said clutch driver.

19. The washing machine according to claim 12, and further comprising a bellows-like body to seal said aperture, wherein said bellows-like body is linked to said clutch driver.

20. The washing machine according to claim 11, and further comprising a cover to be positioned across said opening, wherein said cover is linked to said clutch driver.

21. The washing machine according to claim 2, and further comprising a cover to be positioned across said opening, wherein said cover is linked to said clutch driver.

22. The washing machine according to claim 1, wherein said motor bracket surrounds said motor.

* * * * *